United States Patent [19]

Wood

[11] Patent Number: 5,390,285
[45] Date of Patent: Feb. 14, 1995

[54] METHOD AND APPARATUS FOR TRAINING A NEURAL NETWORK DEPENDING ON AVERAGE MISMATCH

[75] Inventor: David C. Wood, Woodbridge

[73] Assignee: British Telecommunications public limited company, London, United Kingdom

[21] Appl. No.: 50,399

[22] PCT Filed: Nov. 8, 1991

[86] PCT No.: PCT/GB91/01967
§ 371 Date: May 10, 1993
§ 102(e) Date: May 10, 1993

[87] PCT Pub. No.: WO92/09044
PCT Pub. Date: May 29, 1992

[30] Foreign Application Priority Data

Nov. 8, 1990 [GB] United Kingdom ............... 9024332

[51] Int. Cl.⁶ ............................................. G06F 15/18
[52] U.S. Cl. ........................................ 395/23; 395/24; 395/25
[58] Field of Search ........................... 395/23, 24, 25

[56] References Cited

U.S. PATENT DOCUMENTS

| | | | |
|---|---|---|---|
| 4,914,603 | 4/1990 | Wood | 395/23 |
| 4,918,618 | 4/1990 | Tomlinson, Jr. | 395/23 |
| 5,004,309 | 4/1991 | Caulfield et al. | 359/1 |
| 5,068,801 | 11/1991 | Clark et al. | 395/25 |
| 5,099,434 | 3/1992 | Stoll et al. | 395/23 |

OTHER PUBLICATIONS

Vector Quantization Codebook Generation Using Simulated Annealing, J. Kelly Flanagan, Darryl R. Morrell ... IEEE/ 23–26 May 1989.

Image Vector Quantization Using Neural Networks and Simulated Annealing, M. Lech and Y. Hua, IEEE/1992 7–9 Apr. 1992.

Optics Letters, vol. 13, No. 3, Mar. 1988, "Optical Implementation of the Hopfield Model for two-Dimensional Associative Memory," pp. 248–250.

Optical Neural Computers, "Can computers be built to solve problems, such as recognizing patterns, that entail memorizing all possible solutions? The key may be to arrange optical elements in the same way as neurons are arranged in the brain," by Yaser S. Abu-Mostafa et al., pp. 66–73.

IEEE International Conference on Neural Networks, Jul. 24–27, 1988, "Implementation of Neural Networks Using Quantum Well Based Excitonic Devices—Device Requirement Studies" by Singh et al., pp. 411–419.

Report, "Optische Neurocomputer" 1989, by Janosch, pp. 38–44.

(List continued on next page.)

Primary Examiner—Allen R. MacDonald
Assistant Examiner—Richemond Dorvil
Attorney, Agent, or Firm—Nixon & Vanderhye

[57] ABSTRACT

A method of training a neural network (2) having dynamically adjustable parameters controlled by a controller (10) which determine the response of the network (2). A set of input vectors ($I_I$ to $I_n$) are input to network (2) at an input port (4). The corresponding set of output vectors ($O'_I$ to $O'_n$) provided by the network (2) are compared to a target set of output vectors ($O_I$ to $O_n$) by an error logger (12) which provides to the controller (10) a measure of similarity of the two sets. The controller (10) is arranged to alter the dynamic parameters independence on the average number of occasions the output vectors are different from the respective target output vectors. Measuring the similarity of the whole of the output set and target set and adjusting the parameters on this global measure rather than on the similarity of pairs of individual vectors provides enhanced training rates for neural networks having a data throughput rate that can be higher than the rate at which the parameters can be adjusted.

8 Claims, 6 Drawing Sheets

OTHER PUBLICATIONS

*Electronics Letters*, 19 Jul. 1990, vol. 26, No. 15, "Novel Learning Method for Analogue Neural Networks," pp. 1136–1137.

*Electronics Letters*, 19 Jul. 1990, vol. 26, No. 15, "16-Channel parallel Optical Interconnect Demonstration with InGaAs/InP MQW Modulator Array," pp. 1126–1127.

*Applied Optics*, 1 Nov. 1988, vol. 27, No. 1, "Rapid Communications, parallel optoelectronic realization of neural networks models using CID technology" by Agranat et al., pp. 4354–4355.

*IEEE International Conference on Neural Networks*, Jul. 24–27, 1988, "Bimodal Stochastic Optical Learning Machine" by Farhat et al., pp. 365–372.

*1989 Optical Society of America*, "Programmable quadratic associative memory using holographic lenslet arrays" by Jang et al., pp. 838–840.

*Electronics Letters*, 19 Jul. 1990, vol. 26, No. 15, "High Speed Opto-electronic Neural Network," pp. 1110–1112.

*Applied Optics*, 10 Jun. 1990, vol. 29, No. 17, "Adaptive-clustering optical neuralnet" by Casasent et al., pp. 2603–2615.

PCT Search Report of PCT/GM 90/01782.

GRAPH OF THE MODULATION DEPTH OBTAINED FOR EACH WEIGHT CODE.

DEMONSTRATION OF THE EX-OR AND ODD/EVEN PARITY FUNCTIONS

METHOD AND APPARATUS FOR TRAINING A NEURAL NETWORK DEPENDING ON AVERAGE MISMATCH

BACKGROUND

This application is related to co-pending commonly assigned application Ser. No. 07/859,698, filed Jun. 11, 1992 naming Rejman-Greene et al as inventors.

I. Field of the Invention

This invention relates to a method of training a neural network having an input for inputting input vectors, an output for outputting output vectors and an adjustable response determining means for determining which output vector is output by the network in response to the inputting of a given input vector.

II. Related Art and Other Considerations

A neural network can, in general terms, be regarded as a series of nodes, each node providing an output which is some function of the outputs of other nodes to which the node is coupled. For example, a particular node might output a signal at a first level if the weighted sum of the outputs of those other nodes exceeds some set threshold and a signal at a second level if it doesn't. Different nodes may receive the outputs from different sets of other nodes, with weightings and threshold values particular to that node. An input vector is coupled to a set of the nodes via the input of the network and an output vector is generated at the output of the network. The response of the neural network to the input vector is determined in this case by the values of the weightings and thresholds which collectively form the response determining means for this type of network.

Other implementations of neural networks may employ techniques different to the weighting and threshold technique described above but will nevertheless have some response determining means which determines the output vectors provided by the particular network in response to input vectors.

An example of an optical implementation of a neural network is described in an article by N. M. Barnes, P. Healey, P. McKee, A. W. O'Neill, M. A. Z. Rejman-Greene, E. G. Scott, R. P. Webb and D. Wood entitled "High Speed Opto-Electronic Neural Network", Electronics Letters 19th July 1990, Vol 26, No. 15, pp 1110-1112. This exploits the possibilities of parallel processing and optical interconnections to provide a high throughput. That is, the neural network has a rapid response to an applied input vector, which in the reported configuration can be clocked at rates in excess of 10 Mbits/s. The network is shown at FIG. 1 of this application. It is a two-layer perception network which can recognise exclusive-or (EXOR) combinations in a pair of input stream A and B.

Its basic operation is to perform a matrix-vector multiplication in which each row of a 4×4 optical detector array 80 provides an electrical signal corresponding to the sum of the light intensities impinging on the row.

A computer generated hologram 100 and lenses 102 and 104 generate intensity coded beams (not shown) directly from a single laser source 106 which impinge on the individual modulators of a modulator array 82. The relative intensities of the beams are shown by the numerals on the modulators. These different intensity beams provide the different weightings to be applied to the outputs of the modulators in their connection to the nodes formed by the rows of detectors.

A signal is passed to the next level via pre-amplifiers 84 or not, depending on whether this weighted sum is above or below some set threshold either a fixed bias from a bias supply 86 or relative to one of the other weighted sums.

There are several ways in which the number of intensity coded beams could be generated including, for example, using a fixed mask to filter the intensity of individual beams from an array of sources.

A novel method of determining the weights devised by the applicant (not published at the time of filing this application) for an optical neural computer is based on the fact that the modulation depth that can be achieved at a given wavelength for a multiple quantum well (MQW) modulator is determined not only by the voltage swing of the digital drive but also by the applied bias across the modulators. See FIG. 3 of N. M. Barnes, P. Healey, M. A. Z. Rejman-Greene, E. G. Scott & R. P. Webb, "16 Channel Parallel Optical Interconnect Demonstration with an InGaAs/InP MQW Modulator Array," Elect Letter, 26, 1126-1127 (1990). This behaviour means the modulation depth can be adjusted by changing the bias voltage, even if the voltage swing of the digital drive which determines whether the modulator is in the "on" or "off" state is unaltered. By the addition of a low pass filter to the circuit of FIG. 1, a slowly varying (10-100 KHz) analogue bias voltage can be superimposed onto the fast (about 50 Mhz) digital data. Hence the modulation depth, which corresponds to the signal weight, can be changed at a rate of 10-100 Khz. This slowly varying voltage level can be set by standard low-bandwidth analogue drives under computer control. The hologram that produces the multiple beams no longer has to produce beams with a pre-programmed weight matrix. A uniform array of beams can now be used instead, the weights being determined by the independently adjustable bias voltages on the modulators. Further, the weights can now be adjusted during a training phase for the neural network.

This arrangement of optical neural network provides a means of sending high speed digital data through a neural network while still being able to change the weights at more modest speeds under computer control.

There are other ways in which this high data throughput could be achieved—in particular the data signals could be produced externally and illuminate a sandwich of modulator/detector arrays. The modulators could then be addressed independently to adjust the weights.

The bias voltages which determine the threshold levels can also be adjusted at the same slower timescale in these implementations.

In those cases for which the set of desired output vectors ("target set") of the network corresponding to a set of known input vectors ("training set") is known, as appropriate configuration of the response determining means can be achieved by supervised training of the network. That is, the network is presented with the training set of input vectors and the response determining means adjusted according to some algorithm to reduce the error (i.e. increase the similarity) between the actual output vectors from the network and the target set of output vectors.

A known method of training a neural network comprises applying each input vector from the training set to the network in turn. A measure of the similarity of the output vector from the network and the target output vector for that input vector is obtained and the response determining means adjusted in a manner dependent to at least some extent on the measure of similarity. This is repeated for each input vector of the training set in turn.

An example of such a training scheme is described in an article by P. D. Wasserman and T. Schwartz titled "Neural Networks, Part 2" 8294 IEEE Expert Vol 3 (1988) Spring, No. 1 pp 10 to 15.

This method of training neural networks is applicable to those networks which employ such variably bistable modulators, and, indeed, to other networks in which the optical intensity can be varied to determine the weighting. However, a characteristic of such training methods as applied to such an optical neural network is that the computation of the weight and threshold changes that have to be made for a given input vector must be completed before the next input vector is applied to the network. That is, the high data throughput of the network is of no benefit during the training phase because the rate at which the input vectors can be applied to the network is restricted to the relatively slow rate at which the changes can be calculated.

D. P. Casasent and E. Barnard in an article titled "Adaptive Clustering Optical Neural Net" describe pattern recognition techniques for clustering and linear discriminant function selection combined with neural net methods in which a net is trained on an input set of training vectors to classify the inputs into one of c classes. The training algorithm involves inputting each of the input training vectors in turn to the network and for each determining the most active hidden neuron in the proper class and the most active hidden neuron in any other class. Once this has been done, the vector inner product of the weight vector and input vector for each of these two hidden neurons is calculated, a perceptron error function calculated, and an error penalty calculated and added to the error function. The next training vector of the set is then input and the calculations repeated for this next input vector.

After all the training vectors have been input, all the errors and error gradients are accumulated and the weight of the net adapted using a conjugate-gradient algorithm. The training vector set is input repeatedly until satisfactory performance on the test set of input vectors is obtained.

As discussed in this article the inner vector products of the weights of a hidden node and the input vector can be implemented optically.

Because the training method of Casasent et al requires the two class maxima to be determined and the error function and error penalty to be calculated for one input vector before the next can be input to the net, the training scheme does not take advantage of the high data throughput of the neural network although the vector inner product is calculated rapidly in the optical rather than the electronic domain.

SUMMARY

According to the present invention a method of training a neural network having an input for inputting input vectors, an output for outputting output vectors and an adjustable response determining means for determining which output vector is output by the network in response to the inputting of a given input vector. The method comprises:

inputting a series of input vectors to the network so as to obtain a series of corresponding output vectors;

comparing each output vector with a respective target vector; and adjusting the response determining means in a manner dependent on an average mismatch value which value is the average number of occasions the output vectors of the series of output vectors are different from the respective target vectors.

Measuring the average mismatch value of the whole of the output set and target set for a given series of inputs and adjusting the response determining means dependent on this global measure rather than immediately after comparing pairs of individual vectors, and without calculating error functions based on them, provides enhanced training rates for neural networks having a data throughput rate that can be higher than the rate at which the response determining means can be adjusted. This can speed up training by not limiting the rate of applying the input vectors to the relatively slow weight adjustment rate of the network which depends on slower computational elements.

Conveniently, the members of a training set of input vectors are repeatedly input to the network to provide a plurality of series of input vectors, the response determining means being adjusted in dependence on the average mismatch value of each series.

The adjustment can be made, with the training method of the present invention, on the basis of non-whole number of sets of training vectors, ie asynchronously with the training set of vectors. This permits adjustment of the network at as high a rate as the required adjustments can be calculated with no need to wait until the calculations have been completed before training set can be reapplied to the network.

Another particular advantage of the training method is that a small training set of input vectors, that may contain data which is very difficult or expensive to collect, can be readily extended into a large training set by the addition of random noise or distortion. The random additions can be placed on the data anywhere within the network or on the weights and thresholds themselves. Such an extension allows the network to be trained so that its response is robust against the noise or distortion.

Although the method of training of the present invention is seen by the applicant to have particular advantage when applied to training optical neural networks having high data throughput rates, it can be applied to other hardware neural network architectures. It can also be applied to systems where the data throughput rate is comparable to the weight updating rate where it may ease computation of the weight changes, for example.

The algorithm employed to calculate the adjustments to be made to the response determining means, in the above example the weights and thresholds, may be any desired algorithm that attempts to eventually minimise the mismatch value.

Simulated annealing algorithms, as described for example in S. Kirkpatric, C. D. Gelatt Jr, M. P. Vecchi, "Optimisation by Simulated Annealing," Science, 220, 671–680 (1983), or algorithms related to them, are effective at finding a global maximum for complex problems of this type, especially where the variables can only take discrete values. These techniques are however extremely expensive as regards computer time and so have not widely used to date. With the advent of very fast hardware, the computation time for a set of input vectors becomes less and so the technique becomes more feasible. If, for example the network takes data at a rate of 50 MHz and the training set contains 1000 members, data on the similarity of the set of output vectors and a target set can be collected at the rate of 50 KHz and therefore, in principle, 50,000 iterations can be performed each second (assuming the weight and threshold calculations can be made at this rate) each iteration being calculated on information on all 1000 output vectors rather than on the comparison of only one output vector and a target vector. That is, the training method provides a potential 1000-fold increase in training speed for this exemplary network. The actual increase will depend on the algorithms employed.

BRIEF DESCRIPTION OF THE DRAWINGS

The method of the present invention will now be described, by way of example only, with reference to the accompanying drawings of which.

DETAILED DESCRIPTION OF THE DRAWINGS

Figure 1:
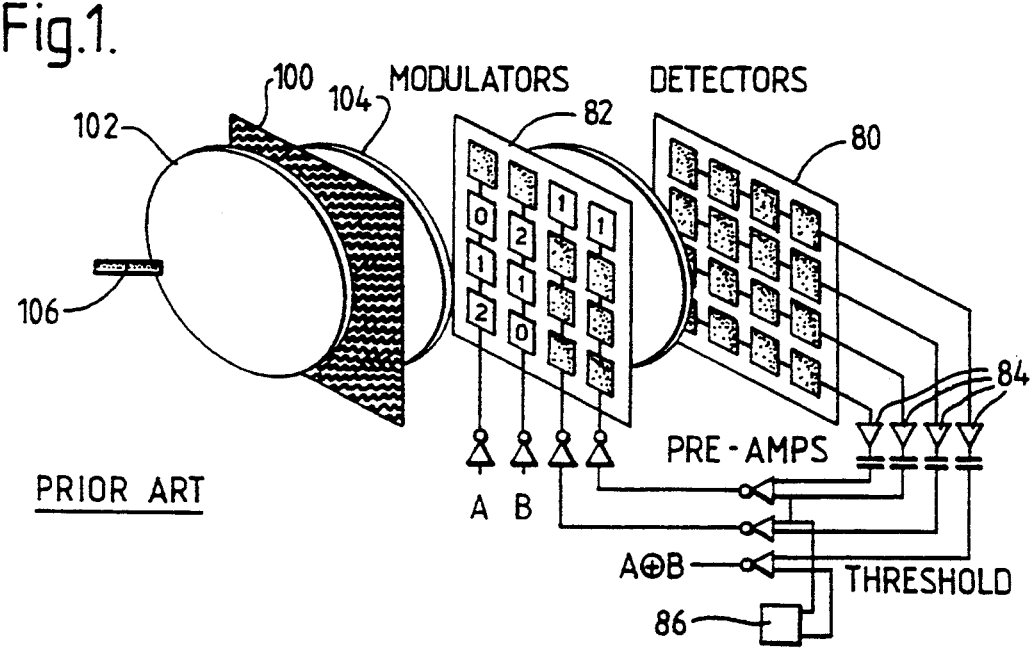
FIG. 1 is a schematic diagram of a prior art optical neural network.

The neural network of FIG. 1 has already been described.

Figure 2:
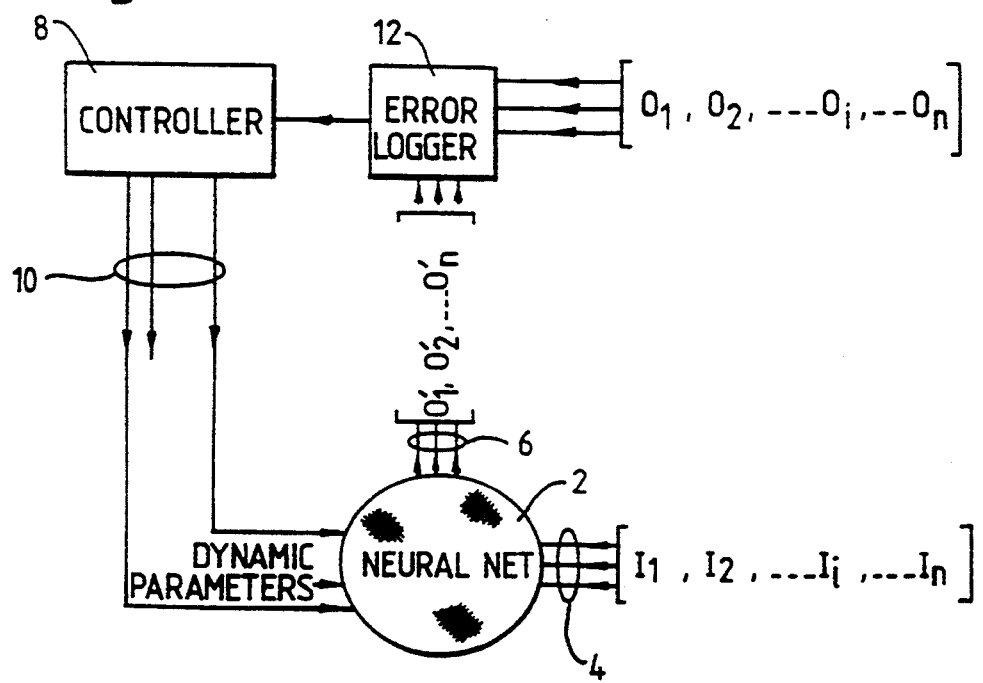
FIG. 2 is a schematic diagram illustrating the steps of the present invention in relation to a generalized neural network providing asychronous training.

The method of training a neural network according to the present invention will now be described in general terms with reference to FIG. 2.

Figure 8:
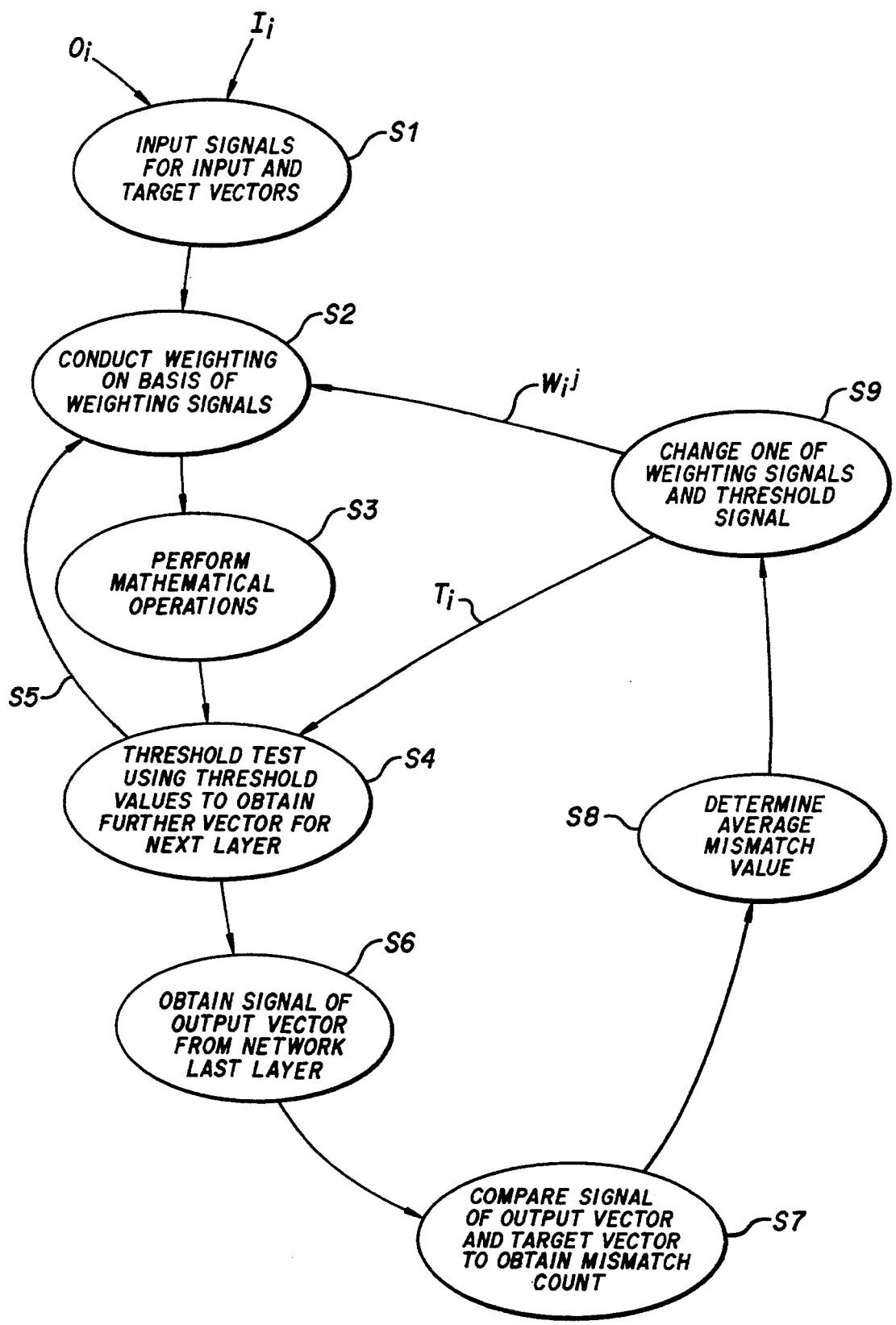
FIG. 8 is a diagrammatic view showing general steps executed by training apparatus and the neural network trained thereby.

A generalized neural network 2, the specific implementation of which is not important to the following description, is able to accept one of a set of input vectors $I_i$, i=1 to n at an input 4 (see step s1 in FIG. 8) and provides at an output 6 a corresponding output vector $O_i$ (see step s6 in FIG. 8). The set of output vectors $O_i$ obtained on inputting the set of input vectors $I_i$ is determined by a response determining means (not shown) of the neural network 2. It is assumed that the response determining means is adjustable by varying various parameters that characterize the network, for example inter-node weightings and thresholds (see step s9 in FIG. 8). In this case they are controllable by means of a controller 8, linked to the neural network 2 by a control bus 10, which may be a general purpose computer controlling a hardware implemented neural network or might be a software routing in a software simulation of a neural network in a general purpose computer or an optically implemented neural network.

Consider now that the neural network 2 is to be trained so that for the set of input vectors $I_l$ to $I_n$ it will output respective desired output vectors $O_l$ to $O_n$. The desired output vectors $O_l$ constitute the target set of output vectors for the neural network 2 and of the training set input vectors $I_i$.

The members of the training set of input vectors $I_i$ are applied consecutively to input port 4 of the neural network 2 (see step s1 in FIG. 8) which provides at its output port 6 a corresponding set of output vectors $O'_1$ to $O'_n$ which for an untrained network will not, in general, be the same as the target set $O_l$ to $O_n$.

A series of vectors $O_i$ of the target set and the respective output vectors $O'$ from the neural net 2 are input to an error logger 12 which makes a comparison and keeps a count of the number of mismatches of output vectors $O'$ and the target output vectors $O_i$ (see step s7 in FIG. 8).

This count is made available to the computer controller 8 which adjusts the parameters of the neural network 2 dependent on an average mismatch value which value is the average number of occasions the output vectors of the series of output vectors (see steps s8 and s9 in FIG. 8) are different from the respective target vectors. This adjustment in general will be made asynchronously with the input of the training set of vectors, ie made before a whole number of repeats of the training set have been input to the network.

The training set and target set are repeatedly applied to the neural network 2 and the error logger 12, respectively, for as long as the algorithm determines.

In the case of a neural network in which the throughput is very high compared to the rate at which the computer can calculate the required changes to the neural network parameters, this approach of looking at the average mismatch value for a series of input vectors allows the training to work on a large training set without the need for synchronism between the application of the input vectors to the network and the computation. That is, the training method of the present invention allows asynchronous training with the average mismatch value being determined by the computer implementing the algorithm at the rate at which it can calculate the desired changes to the network whilst the training data and the mismatch value is built up at the high throughput rate the hardware allows.

It is emphasised, that the invention is applicable to neural networks generally, whether they be implemented as hardware, are suitably programmed general purpose computers or are otherwise implemented.

Figure 3:
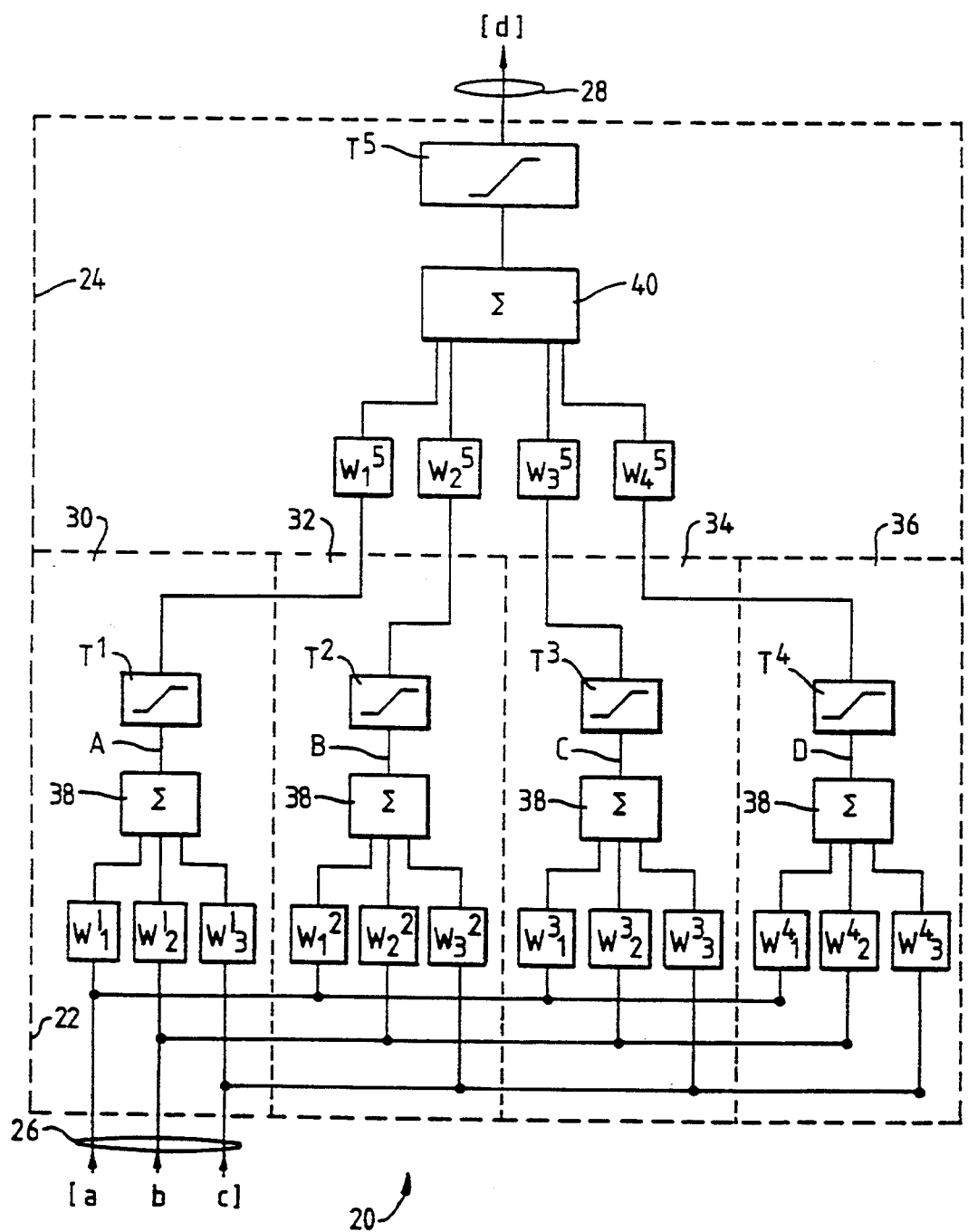
FIG. 3 is a schematic diagram of an exemplary neural network to which the training method of the present invention is applicable.

Referring now to FIG. 3, a functional diagram of a simple neural network 20 having first and second layers 22 and 24, respectively, is shown. Network 20 has been used in a model for a computer simulation of the present invention. The network 20 has an input port 26 for receiving a 3-bit binary word (see step S1 in FIG. 8), input vector [a, b, c] and an output port 28 at which a single binary bit, output vector [d] is output.

The first layer comprises four nodes 30, 32, 34 and 36. In the node 30 the individual bits of an input vector [a, b, c] are weighted by weights $W'_1$, $W'_2$ and $W'_3$ respectively (see step s2 in FIG. 8). The weighted input bits are then summed by an adder 38 (see step s3 in FIG. 8) the output of which is subject to a threshold test, denoted by $T^1$, which produces a "zero" level signal if the sum is below the threshold $T^1$ and a "one" level signal if the sum is above the threshold $T^1$ (see step s4 in FIG. 8).

Nodes 32, 34 and 36 are similarly configured with weight and threshold sets ($W_1^2$, $W_2^2$, $W_2^3$, $T^2$) ($W^3_1$, $W^3_2$, $W^3_3$, $T^3$) and ($W^4_1$, $W^4_1$, $W^4_2$, $W^4_3$, $T^4$), respectively. Adders of these nodes are identical and are each referenced 38.

The outputs from thresholds $T^1$, $T^2$, $T^3$ and $T^4$ (A, B, C and D) form a 4-bit input vector which is input to the second layer 24 which comprises a single node (see step s4 in FIG. 8). This second layer (or node) 24 has four weighting elements $W_1^5$, $W_2^5$, $W_3^5$, $W_4^5$ and a threshold element $T^5$ (see steps s5, s2 and s3 in FIG. 8).

Weighting $W_1^5$ is applied to the output of the threshold element $T^1$ of the first layer 22. These weighted values are summed by adder 40 and subject to a threshold test by the threshold element $T^5$ whose output constitutes the output vector [d] of the neural network 20 (see step s5 in FIG. 8).

T is network is trainable by the method of the present invention in which the weights $W^j_i$, i=1-4, j=1-5 and the thresholds $T^j$, j=1-5 are the dynamic parameters under computer control.

Where a neural network is to be implemented as an optical neural network, as shown in FIG. 1 for example, it is not possible to have negative weights as all the beam intensities have positive values. A modification of the neural network of FIG. 3 to accommodate this restriction is shown in the threshold and weight blocks of FIG. 4 where some of the outputs A, B, C, and D from the adders of the nodes 30, 32, 34 and 36 of FIG. 3 are biased relative to the other outputs. In this case comparators 42, 44 and 46 form the outputs A-B, B-C and A-C respectively which are input to threshold elements 48, 50 and 52, respectively. The remainder of the neural network of FIG. 4 is as in the network of FIG. 3.

Figure 4:
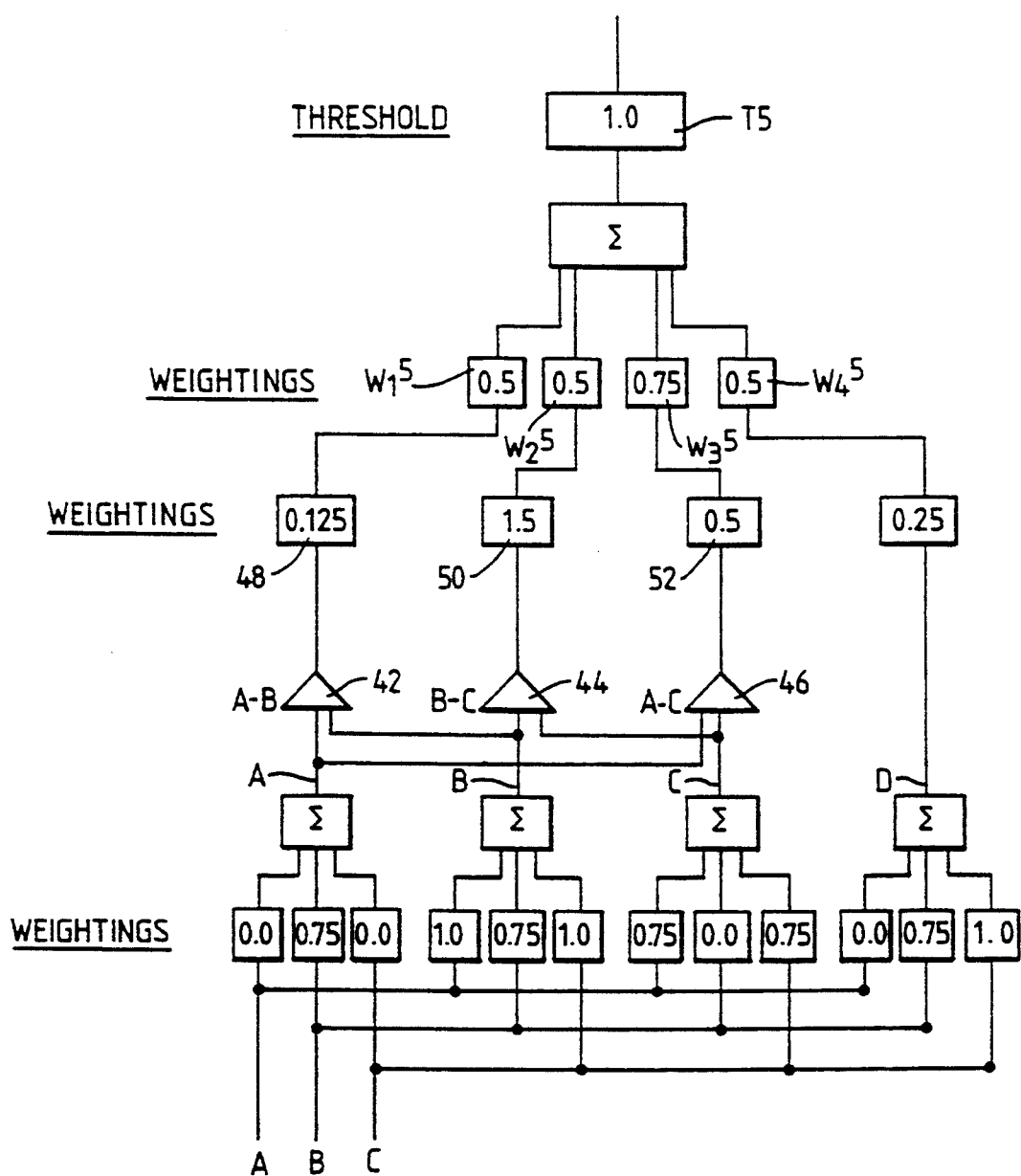
FIG. 4 is a schematic structural diagram of the structure of a neural network suitable for implementation as an optical neural network trained by the method of the present invention.

In a computer simulation applying the training method of the present invention to the neural network of FIG. 4, the weights $W^j_i$ were restricted to five discrete levels 0.0, 0.25, 0.5, 0.75, 1.00 and the thresholds $T^j$ restricted to eleven levels 0.5 to 1.5 in steps of 0.125.

The network was trained to produce an output vector [0] for all binary three bit input vectors [a, b, c] except for [0,1,0] when the output vector [1] was to be produced.

There are eight possible combinations of the three, binary input data channels. These eight combinations were input as a training set in a closed loop. Random, uniform noise was added to the signals 2 to the first layer of the network and after the threshold elements $T^5$. The addition of random noise produced an increase the length of the training data loop and the network had to find the weights and threshold levels that gave not only the desired output, but also made the output robust against the noise level. Loop lengths of a few thousand were used in the computer simulations of the training method. The resultant values of weightings and thresholds are as shown in FIG. 4.

Other schemes may be used to introduce noise to extend the training set, as convenient to the particular implementation of neural network.

Using a form of simulated annealing to minimise the error count in the training loop, solutions have been found with the network of FIG. 4 for every logic or recognition problem that has been attempted, including recognition of one or two elements of the eight possible input patterns and parity checks. In the algorithm, a change is proposed to one of the weight or threshold levels and the new error count in the training loop calculated. If the new average mismatch value is lower than before, the change is accepted. If the new average mismatch value is larger, by an amount $\Delta \epsilon$, the change is accepted if exp $(-\Delta \epsilon/T)$ is less than a random number in the range 0 to 1 for some fictitious "temperature", T. The iterations begin with T large, so that almost all proposed changes are accepted. T is then gradually cooled, ie reduced when monotonically, so that changes that increase the average mismatch value are accepted with a decreasing probability and the network is forced into a configuration that minimises the error. The iterations are stopped when the average mismatch value reaches an acceptable figure. There are a large number of possible configurations that give zero errors when no random noise is added to the system and the training scheme finds the solution rapidly. As the noise level increases, the number of acceptable solutions decreases and more iterations are needed to find a solution. A network that is trained in the presence of a large amount of noise is then robust to the addition of noise up to this level.

Software simulations of the two-layer neural network of FIG. 4 have shown it can be trained to perform any recognition or logic function on three-bit input data. The software simulations were, however, very time consuming and took several hours of computer time for each pattern.

Figure 5:
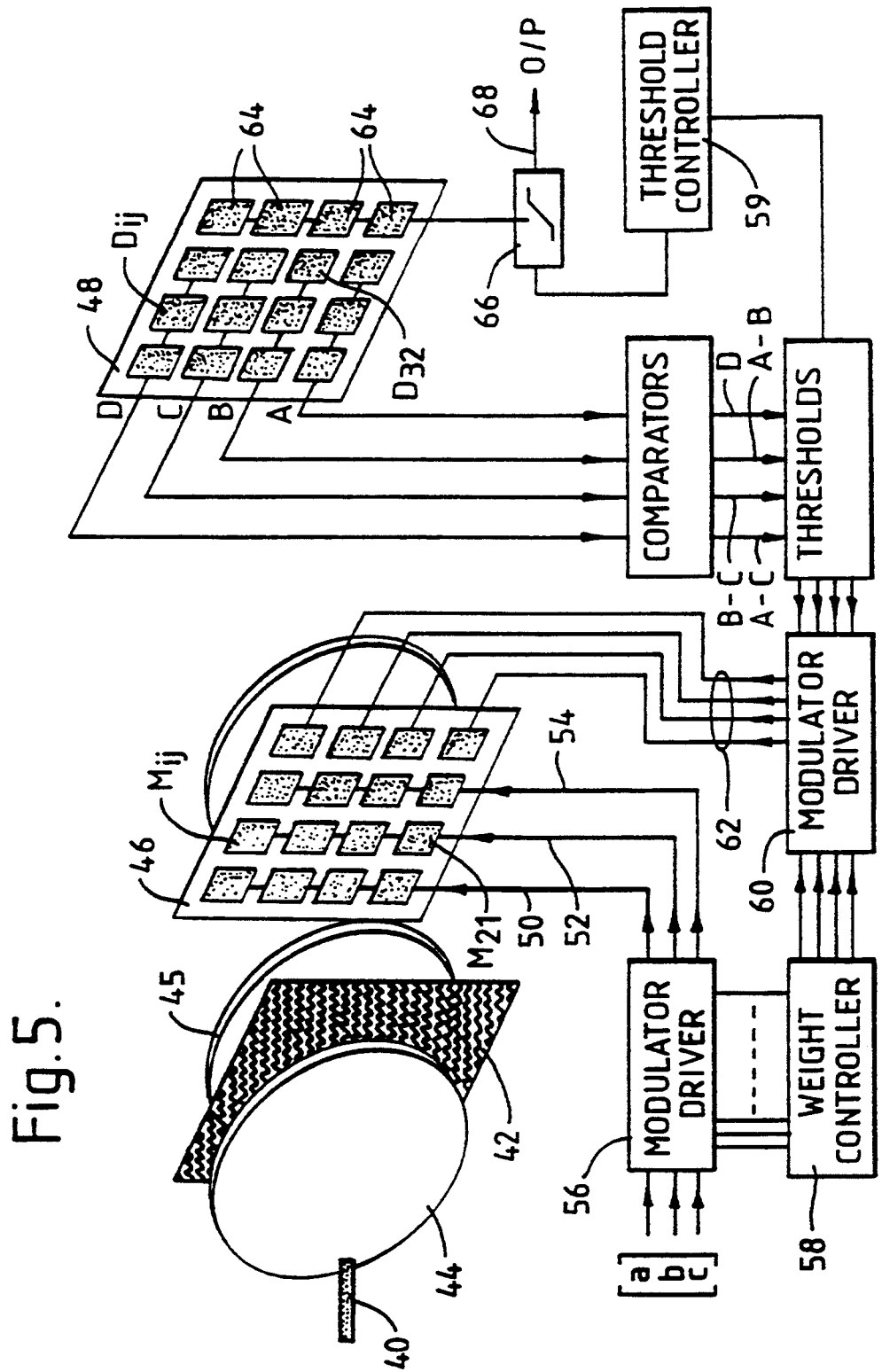
FIG. 5 is a schematic diagram of an optical neural network implementing the structure of the trained neural network of FIG. 4 after training to have a specific response.

Referring now to FIG. 5, an optical neural network is configured as the neural network of FIG. 4 to demonstrate experimentally the training method of the present invention.

A 1.5 $\mu$m laser 40 illuminates a computer generated two-phase hologram 42 which in this case produces a sixteen-way optical interconnect via a lens 44 which produces a 4×4 array of nominally equal intensity light beams (not shown) which are focused onto respective modulator elements $M_{ij}$ of a 4×4 planar array of multiple quantum well (MQW) modulators driven by high-speed SMOS circuits 46 by a further lens 45. The modulated beams are focused onto respective detectors $D_{ij}$ of a detector array 48 which feed transimpedence amplifiers and comparators. An indium phosphide detector array was used instead of the multiple quantum well devices to improve sensitivity.

Figure 6:
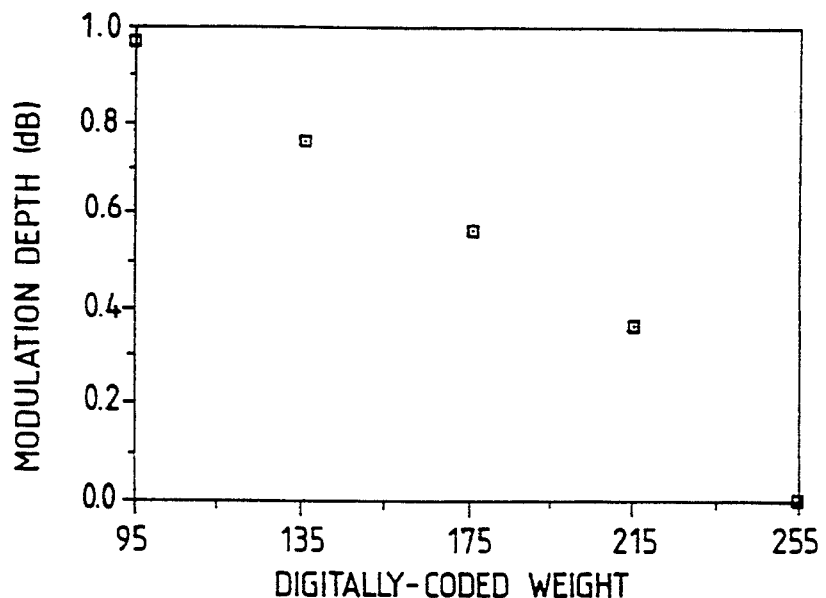
FIG. 6 is a graph of the modulation depth obtained for the weight of the network of FIG. 5.

The MQW modulator drive circuitry provided adjustable interconnection strengths or weights. This was possible because the modulation depth from an MQW modulator is dependent upon the dc bias applied across the device as well as the ac-coupled data signal. FIG. 6 shows the five-band-coded weight values and the resulting modulation depth from a single return to zero (RZ) transition of the modulators. A variable dc bias or threshold was added to the inverting input of each comparator to produce a trainable threshold function. The analogue voltages for the weight and thresholds were both derived from eight-bit digital-to-analogue converters. The time constant in the analogue rate circuitry resulted in a maximum settling time of 25 $\mu$s, the threshold circuitry having a settling time of 2 $\mu$s whilst the modulators detectors and amplifiers can be driven at 40 Mbit/s RZ.

For both the modulators $M_{ij}$ and detectors $D_{ij}$, i and j both range from 1 to 4 with i denoting the columns from left to fight and j denoting the rows from top to bottom. One exemplary modulator $M_{21}$ and detector $D_{32}$ is referenced to illustrate the indexing scheme.

The modulators $M_{ij}$ and detectors $D_{ij}$ of the first three columns form the first layer of the neural network 40, whilst the fourth column of the modulators $M_{ij}$ and detectors $D_{ij}$ form the second layer of the neural network 40.

There are three, high-speed, binary input channels 50, 52 and 54 each connected to a column of four, independently weighted modulators. Each modulator $M_{ij}$ is individually addressed by a modulator drive 56 with the combination of high-speed logical data (common to each element in the column) and low speed bias voltage from a weight controller 58 to determine the modulation weight. The output from the detectors is $D_{ij}$ summed in rows. Four binary inputs (A-D, B-C, A-C and D), determined from comparators on the A,B,C,D outputs, are thresholded against a bias voltage set by threshold controller 59. These are fed back into the remaining weighted modulators of the fourth column on the modulator array 46 via a modulator driver 60 and a signal bus 62 with weights for the modulators being provided by weight controller 58. The output from the second layer of four detectors 64 is then summed, and thresholded against threshold 66, to give the final, binary output from the network at output 68.

As the weights are coded here as different optical intensities in the beams they must take positive values.

Figure 7:
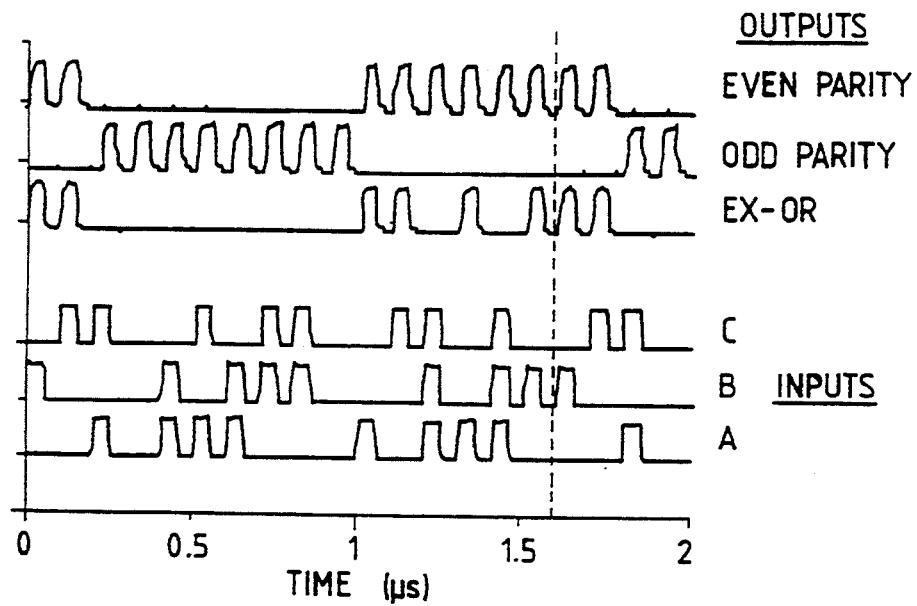
FIG. 7 is a demonstration of EX-OR and ODD-EVEN parity functions of a trend network as shown in FIG. 5.

A pattern generator was set up to repeat continually all numerate input combinations of 3-bit words along with the target output pattern consistent with the required logic function. The training set was arranged to be a large multiple of the eight possible combinations. This ensured that the mismatch value reflected both the ability to distinguish each combination and the average degradation of the ability due to the affect of various noise sources. The chosen multiple was determined by the need to generate a reasonable statistical average mismatch value without seriously compromising training times. In this particular case the training data was applied to the network at 10 Mbit/s RZ with each training cycle consisting of approximately 10,000 words (1,250 repetitions of the test pattern). The same "temperature" t was used for 250 such cycles (250 weight/-threshold changes) before being reduced. At each new value of T the network parameters were reset to those associated with the lowest error count obtained so far. The network was trained to recognise all the 3-bit combinational functions and in particular reproduced the EX-OR and the ODD/EVEN parity functions which are known to require two-layer networks. These functions best indicate the success of a strategy that does not rely on access to the hidden layer neurons. FIG. 7 shows the output of the network after training each pattern and are compared to the respective input words.

Analysis of the training exercises indicates that the recognition of single words generally requires less than 1,000 cycles (20 seconds). The more complex combinational tasks such as the EX-OR and ODD/EVEN parity functions require, on average, 10,000 cycles which reflects the necessity for two-layer processing. Direct comparison with simulation results is unrealistic due to the number of training cycles being highly dependent on the amount and characteristics of the hardware system and the artificial (simulation) noise. Conceptually, we would expect the hardware to require more training cycles due to the fact that the calculations and error counts from the hardware will have a far more complex relationship than those in an idealised simulation. We can however calculate the implicit savings which are obtained due to the use of the high speed hardware. The simulation of the neural network would require 30 seconds to process one cycle of the training set whilst the hardware requires 1 ms—30 thousand times faster the time spent in the three remaining training areas is proportioned as follows: computer processing 25%, computer interfacing 70% and optoelectronic hardware processing about 5%. There is therefore significant capacity to handle much larger training sets (larger networks or more noise immunity). The large proportion of time spent in communicating between the hardware and the computer is not a fundamental problem as only one message has to be sent in either direction for every training cycle. Therefore, with a purpose built interface, it should be possible to significantly reduce the average training times. These experiments indicate that the strategy is capable of rapidly and regularly producing solutions even though the solution space is extremely granular and no hidden layer monitoring is performed. It has also been found that the training method according to the present invention was still capable of finding solutions when the performance of the hardware was deliberately degraded by adjusting the optical power budget and introducing optical timing misalignment etc indicating the robustness of the method of training when applied particularly to an optical neural network.

I claim:

1. A trainable optical neural network in combination with apparatus for training the neural network, comprising:

a neural network, the neural network comprising:
an array of input terminals to receive a plurality of optical signals defining an input vector;
an array of weighting means for applying preset adjustable weights to signals applied to the input terminals and for obtaining weighted signals, the weighting means including control input terminals to permit adjustment of the preset weights; and
an output terminal for outputting an output vector obtained in response to the weighted signals obtained from the weighting means; and
training apparatus external to the neural network for training the neural network, the training apparatus comprising:
means for repetitively applying a series of training vectors to the input terminals;
error logging means coupled to the output terminal for receiving a series of output vectors produced in response to the series of training vectors and for comparing the output vectors with target vectors to determine mismatches so as to produce an average mismatch value as a function of the number of occasions that mismatches occur for the series of input vectors; and
control means responsive to the average mismatch value for a series of input training vectors, for applying weight adjustment signals to the control input terminals of at least one of the weighting means, for tending to reduce the average mismatch value for the application of the next series of training vectors, and for determining when training is completed.

2. A method of training a multi-layered neural network comprising:
(1) inputting a series of signals constituting input vectors to a first level of the network;

(2) applying adjustable weighting signals to the network whereby a weight is applied to each element of the input vectors;

(3) performing a mathematical operation with respect weighted elements of each input vector to obtain a mathematical operation result;

(4) subjecting the mathematical operation result to a threshold test using an adjustable threshold signal applied to the network to obtain a further vector;

(5) using the further vector as an input vector for a next layer of the network and repeating steps (2) through (4) if the further vector is not obtained from a last layer of the network, otherwise (6) using the further vector as an output vector of the network and producing a signal constituting the output vector at an output terminal of the last layer of the network;

(7) using an error logger external to the network to compare the signal constituting the output vector with a target vector to obtain a count of mismatches therebetween;

(8) using a controller external to the network to determine an average mismatch value for the series, the average mismatch value being the average number of occasions the output vector of step (6) is different from a target vector;

(9) adjusting, in accordance with the determination of step (8), at least one of the weighting signals and the threshold signal.

3. A method as claimed in claim 9 in which one of the weighting signals and the threshold signal is adjusted according to a simulated annealing algorithm.

4. A method as claimed in claim 3 in which the adjustment of a prior execution of step (9) is retained if a subsequent execution of step (9) results in a change of the average mismatch value $\Delta\epsilon$ which is negative or, if positive, if $\exp(-\Delta\epsilon/T) < r$, where T is a constant and r is a random number in the range 0 to 1.

5. A method as claimed in claim 4 in which T is decreased monotonically during further executions of step (9).

6. The method of claim 2, wherein the adjusting of step (9) is conducted substantially asynchronously with the further inputting of signals constituting input vectors at step (1).

7. The method of claim 2, wherein the network is an optical network, and wherein the weighting signals are used to modulate intensities in optical beams employed in the optical network.

8. A trainable neural network in combination with apparatus for training the neural network, comprising:
a neural network, the neural network comprising:
a plurality of input terminals for receiving a plurality of signals defining an input vector;
a plurality of weighting means for applying preset adjustable weights to the signals applied to the input terminals and for obtaining weighted signals, the weighting means including control input terminals to permit adjustment of the preset adjustable weights; and
an output terminal for outputting an output vector obtained in response to the weighted signals obtained from the weighting means; and
training apparatus external to the neural network for training the neural network, the training apparatus comprising:
means for repetitively applying a series of training vectors to the input terminals;
error logging means coupled to the output terminal for receiving a series of output vectors produced in response to the series of training vectors and for comparing the output vectors with target vectors to determine mismatches so as to produce an average mismatch value as a function of the number of occasions that mismatches occur for the series of input vectors; and
control means responsive to the average mismatch value for a series of input training vectors, for applying weight adjustment signals to the control input terminals of at least one of the weighting means, for tending to reduce the average mismatch value for the application of the next series of training vectors, and for determining when training is completed.

* * * * *